Aug. 4, 1925.
W. A. MILLER
1,548,474
METHOD OF AND APPARATUS FOR MOLDING SILICA BRICK
Filed July 30, 1924    6 Sheets-Sheet 1
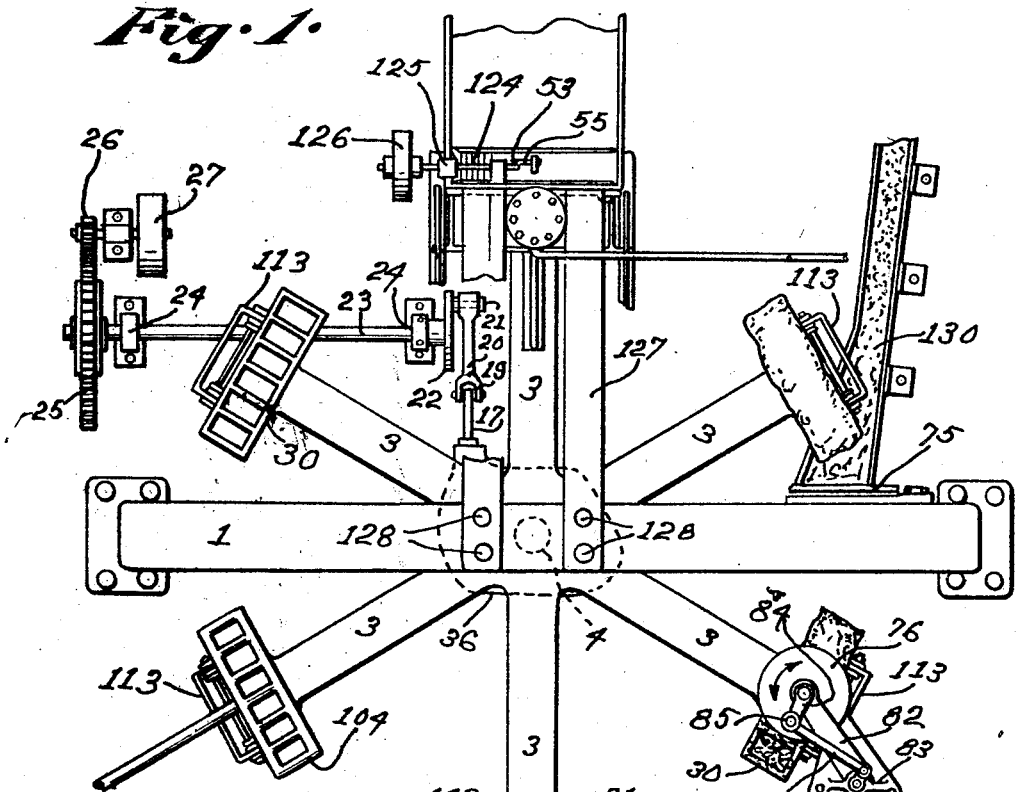
Inventor:
William A. Miller,
By Hugh K. Wagner,
Attorney Aug. 4, 1925.

W. A. MILLER 1,548,474

METHOD OF AND APPARATUS FOR MOLDING SILICA BRICK

Filed July 30, 1924  6 Sheets-Sheet 2

Inventor:
William A. Miller,
By Hugh K. Wagner.
Attorney.

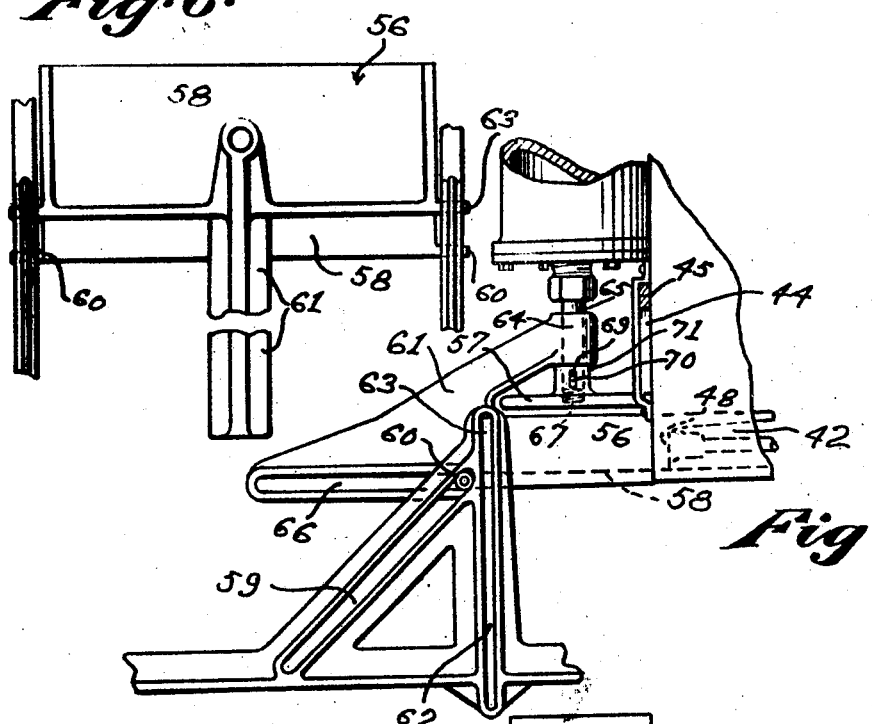
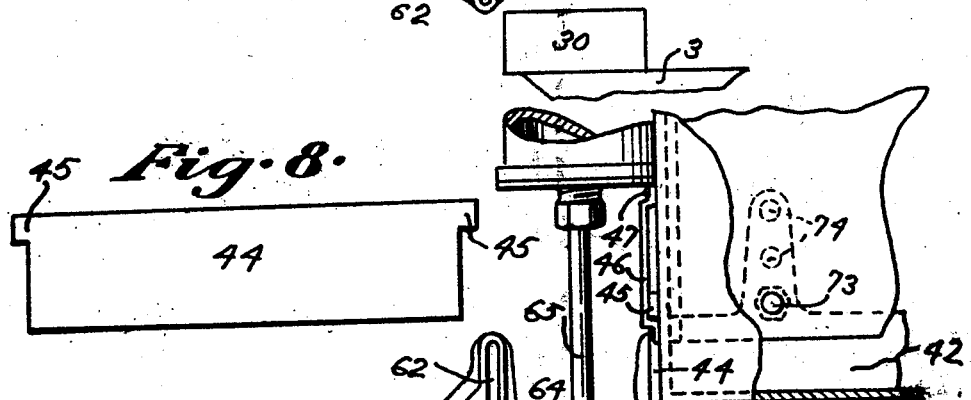

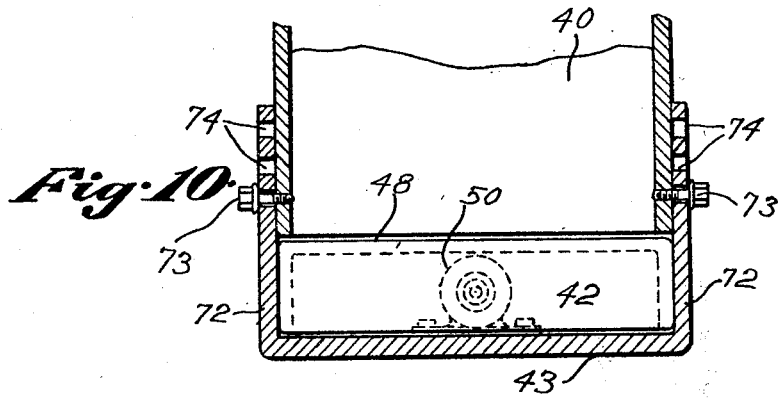
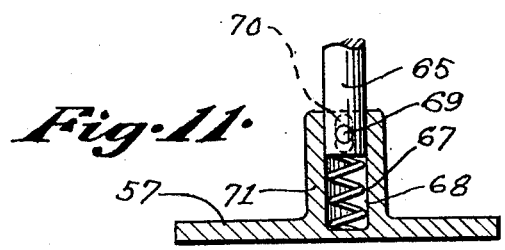
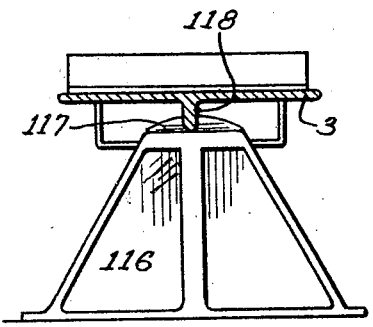
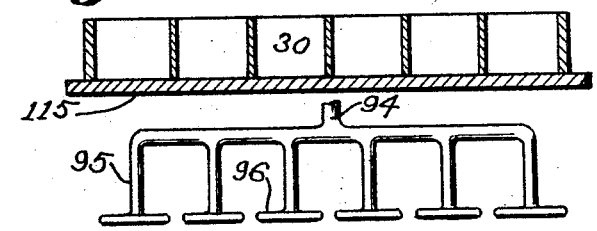
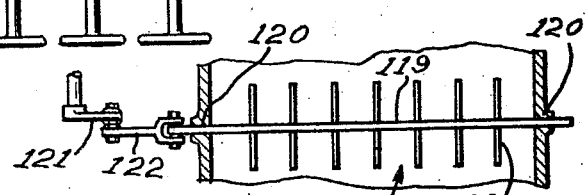
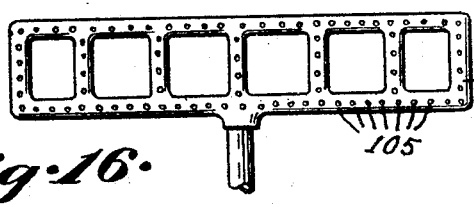

Aug. 4, 1925. 1,548,474
W. A. MILLER
METHOD OF AND APPARATUS FOR MOLDING SILICA BRICK
Filed July 30, 1924 6 Sheets-Sheet 5
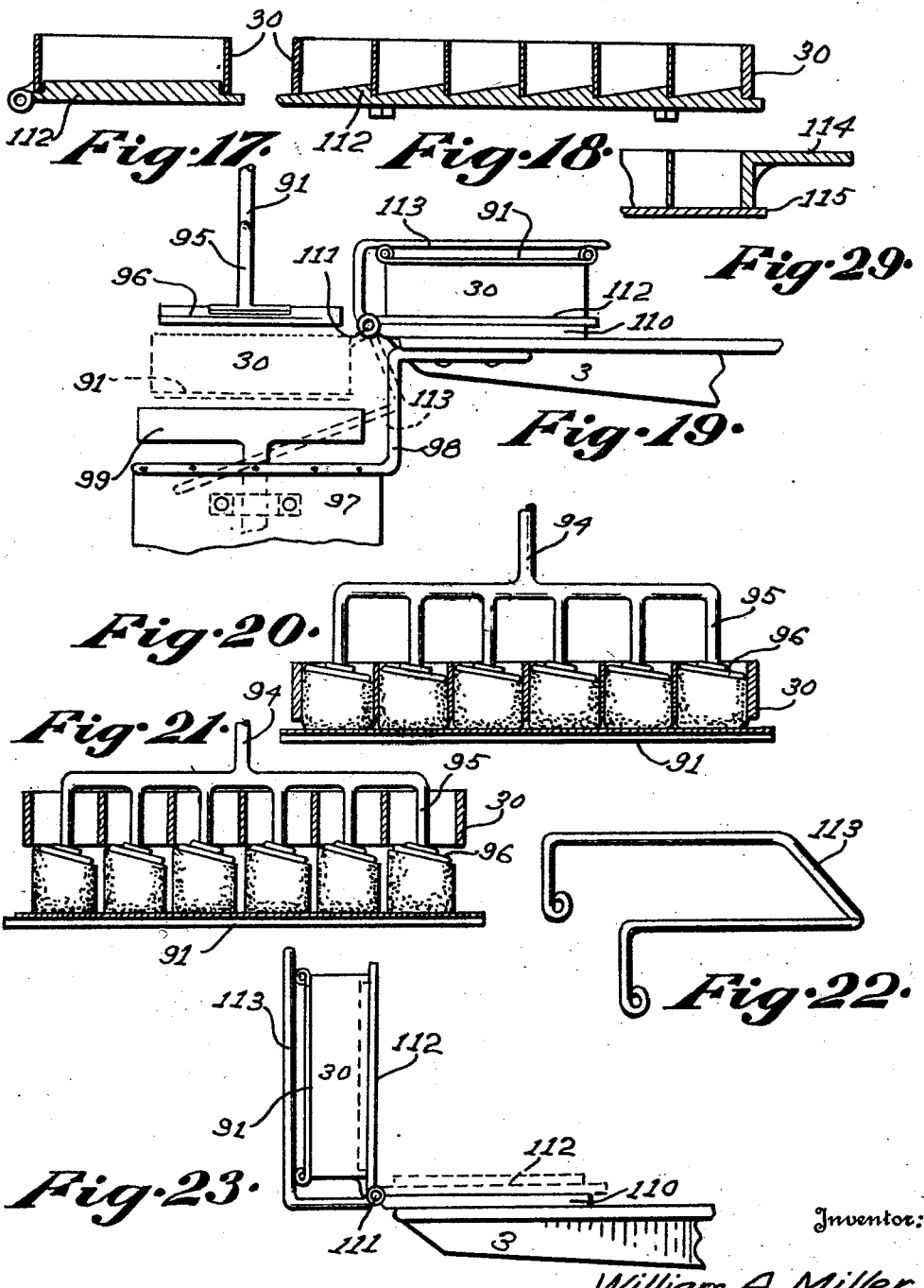

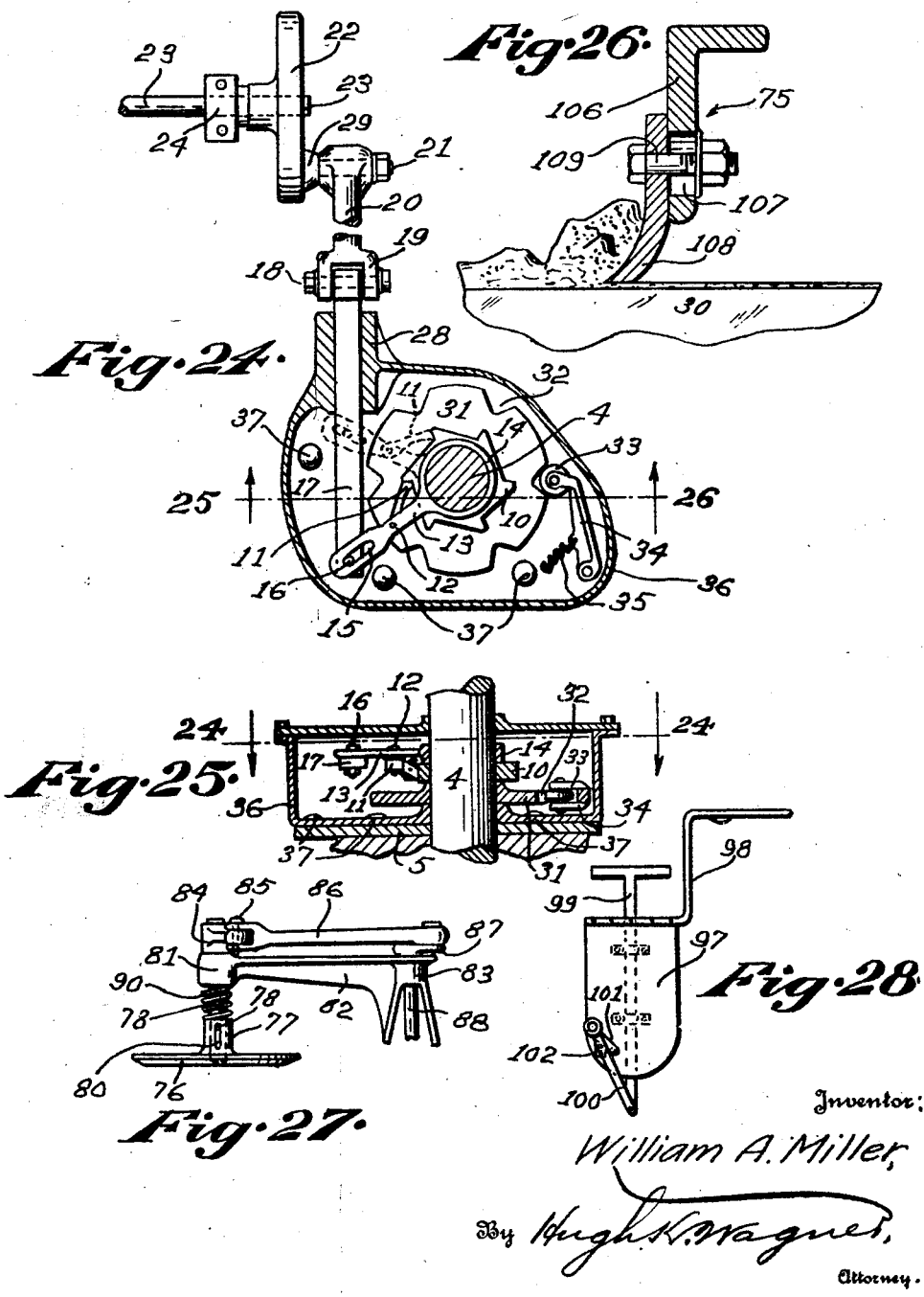

Patented Aug. 4, 1925.

1,548,474

UNITED STATES PATENT OFFICE.

WILLIAM ALLEN MILLER, OF PITTSBURGH, PENNSYLVANIA.

METHOD OF AND APPARATUS FOR MOLDING SILICA BRICK.

Application filed July 30, 1924. Serial No. 729,081.

*To all whom it may concern:*

Be it known that I, WILLIAM ALLEN MILLER, a citizen of the United States, residing at the city of Pittsburgh, in the county of Allegheny, State of Pennsylvania, have invented certain new and useful Improvements in Methods of and Apparatus for Molding Silica Brick, of which the following is a specification.

This application for patent is for the same subject-matter as this inventor's application for patent filed August 30, 1920, Serial 406,756, allowed September 17, 1921.

This invention is a method of and apparatus for molding or forming silica brick. A special problem in producing such articles arises from the nature of the material of which silica brick are composed. This material is crushed ganister rock, water, and milk of lime. The condition of this material when ready to be molded is not plastic, but somewhat resembles moist sand. The particles forming a body of this material when moist by reason of mixture with water and milk of lime cling somewhat together, but do not closely adhere together. A body of this moist material can be handled as a lump, but possesses almost as great tendency to disintegrate as to hold together. This material is quite weighty for its bulk and does not admit of much compression. Some of its particles after the ganister rock has been crushed are as small as grains of sand, while there are, also, scattered through it flakes, chips, and pieces of considerably larger size and of various sizes. Due to its weight, manual handling of this material is hard labor. Due to its comparative incompressibility, it is impossible to mold it like ordinary clay by machine compression, such as is used in the making of building and paving brick or in molding plastic fireclays.

The present process is an adaptation of and improvement on the method known among makers of silica brick as the "slop mud silica" process. Most manufacturers of silica brick at the present time are using the slop mud method of throwing the clay into the mold by hand. This is due to the following reasons. If silica clay is made dry enough for a direct heavy-pressure machine to handle, when the brick leaves the machine it has very little bond and is so fragile that it can not be handled. On the other hand, if plenty of moisture is added to the clay it is difficult for a direct heavy-pressure machine to handle it, and the result is that the pressure required to form sharp corners and edges is so great that it squeezes out part of the milk of lime and water and, also, makes the brick quite dense. Too much density in a silica brick imparts to it a tendency to crack and spall under sudden changes of temperature. This is, of course, objectionable. On the other hand, a porous silica brick absorbs heat quickly and throws off heat quickly, thereby saving time in the heating and cooling of furnaces, with less danger of cracking or spalling. Porosity is, therefore, a desirable quality in silica brick.

In the manufacture of silica brick as heretofore practiced there has been a regular percentage of "spongy" corners in the product, due to the imperfections of the method of putting the mass of so-called silica clay into the mold. This being done by hand, it naturally follows that in many instances the material is not thoroughly and firmly pressed into the corners of the molds. Mold-marked brick have heretofore been common. This is due to the uneven withdrawal of the molds. In former practice it has been the universal custom to sand the mold in preparation for the clay, but it quite frequently happens that the sander allows too much sand to cling to the mold. This sand crumbles away when the bricks are dried or burned, and is a detriment to the brick. It is a common fault in the present practice for the bricks not to be properly slicked, such defectives running to a large percentage. In the hand process now in common use it is necessary for the hands of the molders to be protected by rubber gloves, which form a considerable item of expense. Furthermore, the common hand-molding method requires skilled hand-molders and offbearers. One authority in this line of manufacture has estimated that the cost is about three hundred dollars to train a new man to mold slop mud brick, not taking into consideration the bad brick that the new man makes while learning, but based only on the fact that on an average only five out of eight men stick until sufficiently proficient to produce a proper quantity per day. If, when thus trained, the workman with or without reason lays off for a day the factory output for that day diminishes and the average cost for that day is increased.

All of the above-mentioned objections are eliminated by the use of the process and machine described herein. The cost of the sand and rubber gloves is done away with. Skilled labor is unnecessary. In actual practice it has been found, under severe tests, that every brick turned out by this machine is properly slicked and has a clean smooth surface. The disuse of sand in the machine and process herein described leaves each brick with a solid and clean surface, such as can not be obtained when sand is used. The use of water to clean each mold, as hereinafter described, insures the perfect washing and cleaning of each mold before it receives its charge. This results in cleaner-surfaced bricks. Furthermore, this machine and process produce solid uniform brick without "spongy" corners, and the mechanical withdrawal of the molds prevents any bricks being mold marked.

In addition to all the advantages mentioned above, the use of this machine and process effects a saving of more than two dollars per thousand in the cost of manufacturing silica bricks in the operations from the grinding mills to the rack cars or similar point.

In the accompanying drawings forming part of this specification, in which like numbers of reference denote like parts wherever they occur.

Figure 1 is a top plan view;

Figure 2 is a detail of the means for shifting the inlet of steam to the pusher mechanism;

Figure 3 is an elevation at a right angle to Figure 2;

Figure 6 is a front elevation of the means for withdrawing the bottom from the forming chamber;

Figure 7 is a side elevation thereof;

Figure 8 is an elevation of the closure for the clay chamber;

Figure 9 is a view similar to Figure 7 but showing the bottom for the forming chamber withdrawn, so that the clay can pass out of the forming chamber, while in Figure 7 such bottom is in place to hold the clay from falling;

Figure 10 is a vertical sectional view through the clay chamber, showing means for its adjustment for various sizes of brick;

Figure 11 is a detail view of the resilient connection between the platen and its driving shaft;

Figure 12 is an illustration of the method of supporting the end of the rotating arms when receiving the charge of material into the molds thereon;

Figure 13 is a detail of the offbearer and a plain-brick mold;

Figure 14 is a detail of a device for causing the bricks to follow the offbearer as it sinks;

Figure 15 is a detail of an agitator located in the mud hopper;

Figure 16 is a detail of the spray for cleaning and lubricating the molds;

Figure 17 is a transverse sectional view through one of the molds;

Figure 18 is a longitudinal sectional view through the same mold;

Figure 19 is an end elevation showing a mold borne by one arm of the rotary table and in dotted lines its changed position when deposited on the lowering mechanism;

Figure 20 is a view partly in section longitudinally through a mold and with the brick remover in position adapted to push the bricks while the carrying-off plate is being lowered;

Figure 21 is a similar view, but showing the carrying-off plate lowered;

Figure 22 is a detail of the device for holding the retaining plate in position to keep the bricks from leaving the mold while the same is being rocked from the revolving table to the lowering mechanism;

Figure 23 illustrates the operation of rocking the mold from the revolving table to the lowering mechanism;

Figure 24 is a sectional view showing the mechanism for imparting intermittent or rotary movement to the revolving table, the said section being taken on the line 24—24 in Figure 25;

Figure 25 is a sectional view taken on the line 25—25 in Figure 24;

Figure 26 is a detail of the surplus remover;

Figure 27 is a view of the slicker and parts for operating the same;

Figure 28 is a side view of the mechanism for lowering the bricks from their molds; and Figure 29 is a detail of a modified form of mold with parts broken away.

Figure 5:
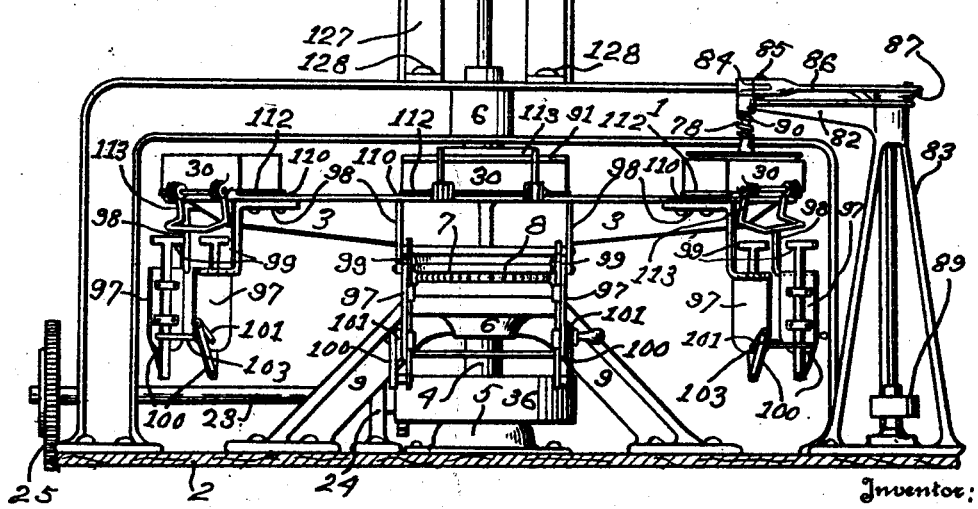
Figure 5 is a front elevation.

Referring first to Figures 1 and 5, the main frame of the machine consists of the I-beam 1, suitably fixed to the floor 2.

The revolving table is composed of a plurality of arms 3, having a common center, through which passes shaft 4, journaled in bearings 5 and 6, provided with balls 7 and ball-race 8 supported by standards 9, which contain or support, also, one of the bearings 6.

The revolving table is driven by the shaft 4 (see Figure 24). Keyed or splined to shaft 4 is the ratchet 10, and shaft 4 is rotated by ratchet 10 under the impulsion of pawl 11. Pawl 11 is pivoted at 12 to an arm 13 bearing a collar 14, loosely mounted on shaft 4. At the end of arm 13 opposite that on which is located collar 14 is a slot 15, in which a pin 16 borne by arm 17 is adapted to slide. At its opposite end arm 17 is pivoted by pin 18 in yoke 19 on arm 20. By pin 21 arm 20 is eccentrically pivoted to rotary member or wheel 22, mounted on the outer end of shaft 23. Bearings 24, or the like, are provided for shaft 23, which is driven by driving gear 25, actuated by pinion 26, driven by pulley 27. Arm 17 reciprocates in sleeve 28, which serves as a guide. When arm 17 is traveling toward the position shown in full lines in Figure 24, pawl 11 rides over the teeth of ratchet 10, but when, in the rotation of the eccentric 29, arm 13 is moved toward the position shown in the dotted line in Figure 24, pawl 11 forces rotation of ratchet 10 and thereby imparts rotary motion to shaft 4, which carries with it the revolving table. Thus an intermittent and step-by-step movement is given each of the six arms 3 that form the revolving table. By this means the molds 30, one of which is borne at the outer end of each of the arms 3, is presented successively at the points where the successive steps of this process are performed, being allowed to rest at each of the said points such predetermined period of time as may be necessary for the performance of such operations thereat as may be desired.

Ratchet 10 is prevented from return or loose motion by guardplate 31, having therein notches 32, in which notches seats guardroller 33, borne by finger 34, constantly under the impulsion of spring 35. Casing 36 surrounds shaft 4 and bears sleeve 28 and incloses the parts for actuating shaft 4 shown in Figure 24, and is itself attached by rivets or bolts 37 to bearing 5, or it may be cast integrally with the bearing 5.

Figure 4:
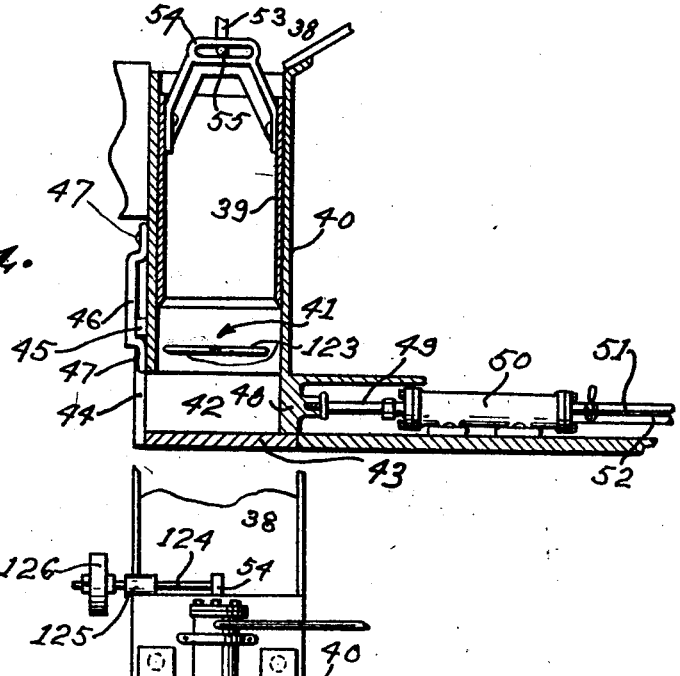
Figure 4 is a sectional view through the mud-hopper and associated parts.

The mixture of crushed ganister rock and milk of lime and water hereinabove described feeds by gravity or otherwise to the mud-hopper 38 (see Figure 4) and falls within open-ended box 39, contained within another box 40, in the lower part of which last-named box is the reciprocating agitator 41.

The clay chamber 42 is formed by means of bottom 43, a closure 44, supported in place by the lugs 45, held by straps 46, fastened by screws 47 to the front wall of box 40 and by the front face of the former 48. The closure 44 forms a wall of clay chamber 42 only part of the time, as will hereinafter appear. Former 48 is a reciprocating member, pushed forward and drawn backward by piston-rod 49, connected to a piston (not shown in the drawings) in cylinder 50, which piston is adapted to be reciprocated synchronously with the rotation of shaft 4 and the step-by-step movement of the revolving table. In brief, whenever a movement of the revolving table has placed a mold 30 radially in line with clay chamber 42, and underneath, but not directly underneath, the said clay chamber 42, steam admitted through pipe 51 into cylinder 50 produces a forward thrust of former 48 into and across clay chamber 42. Steam admitted through pipe 52 causes the retraction of former 48. Of course, suitable exhaust means is provided.

Agitator 41 keeps the material within boxes 39 and 40 (more particularly the latter) from packing too tight, but at the critical moment when former 48 is thrust forward box 39 is simultaneously thrust downward by rod 53, connected to box 39 by slot 54 and finger 55. The downward thrust of box 39 does not extend further than the bottom of box 40.

Closure 44 for clay chamber 42 is normally in the elevated position shown in Figure 7, which allows the forward thrust of former 48 to push a proper quantity of material out of clay chamber 42 into the forming chamber 56, which is inclosed on three sides by walls, but open at the top so that platen 57 may impact upon the material to be molded into bricks, doing so simultaneously with the rapid withdrawal of movable bottom 58, whereby the first blow of the platen 57 upon the clay to be molded continues as a forward impulse for the said clay, thus hurling the same into the mold 30 located directly therebeneath. When the platen 57 is in its elevated position shown in Figure 7, it holds closure 44 in its elevated position, but, simultaneously with the descent of platen 57, closure 44 is allowed to drop to the position shown in Figure 9, thereby preventing the spilling of any material out of clay chamber 42.

The movable bottom 58 is given its withdrawing motion by means of the guide slot 59 and the follower pins 60, the latter being attached rigidly to the aforesaid movable bottom 58. Simultaneously, the three walls of the forming chamber 56, being formed integrally with the sliding casting 61, are given a vertical motion with the aforesaid casting by means of the vertical slot 62 and the guide-blocks 63 sliding therein, together with the action of the collar 64 being guided in a vertical path by means of its surrounding the ramming shaft 65 the movable bottom 58 is kept in a horizontal plane by means of the guide slot 66 formed in casting 61 (see Figures 7 and 9). Platen 57 is made to strike a resilient blow by means of the spring 67 coiled in a hole 68 contained in a collar 71 formed on platen 57 and working against the shaft 65, which is slidably mounted in said hole 68, but is kept from leaving same by means of the pin 69 being mounted horizontally through shaft 65 and slot 70 of the collar 71 attached to platen 57 (see Figures 7, 9, and 11). Clay chamber 42 is made adjustable by means of its side walls 72 (see Figure 10) being made so that they slide over the walls of box 40 and admit of being bolted thereto by bolts 73 passing through any of a series of holes 74 cut into sides 72 of clay chamber 42. Any change in the volume of the chamber necessitates a change in the size of the forming head 48, which is so attached to its pusher rod that it is easily exchanged for one of another dimension.

After the mold 30 under the platen 57 has received its charge of mixture in the manner hereinbefore described, it proceeds to advance through the cycle, the description of which follows.

First it advances to the adjustable cutter 75 bolted to the I-beam 1, which is adjusted so that the blade 108 scrapes all surplus mixture off of the mold down to a level which is just above the top edges of said mold (see Figure 26). All surplus mixture is dropped off into a suitable carrying-off trough 130 (see Figure 1). Next the mold advances to a position under a slicker, the object of which is to smooth the top face of the semi-plastic brick down to the level of the top edge of the mold. The slicker consists of a beveled circular plate 76 having formed on its top face the collar 77, the latter fitting over a shaft 78 and slidably held thereto by means of pin 79 fitted horizontally through shaft 78 and the slots 80 cut longitudinally in collar 77. The shaft 78 is journaled vertically in bearing 81, which is formed on the end of arm 82, which in turn is fastened to tripod 83, the latter being rigidly fastened to the floor. Above the bearing 81, shaft 78 rigidly carries the arm 84, which is pinned by means of pin 85 to the connecting link 86, which in turn is pinned to an arm 87, which is given a rotative motion by means of shaft 88, to which the arm is rigidly attached. Shaft 88 is given its motion by means of a belt and the pulley wheel 189 in the conventional manner. A spring 90 mounted on shaft 78 keeps the slicker plate and its appendages at their lowermost position, in order that the said slicker plate may press and smooth the surface of the brick down to the level of the mold. The slicker plate 76 is given a reciprocating movement of rotation by means of the arm 84, the connecting link 86, and the rotating arm 87 (see Figures 1 and 27).

When the mold reaches its unloading position after having a carrying-off plate 91 clamped thereto by the operator, as will hereinafter be described in the mode of operation, there is provided an overhead piston (not shown in the drawing) and cylinder 92 with a hand-operated steam admitting-and-exhausting valve 93 for raising and lowering said piston and its guide shaft 94. Guide shaft 94 has integrally formed at its lower end a plurality of branch arms 95 carrying pusher plates 96. These plates by means of the method just described admit of being given a vertical motion at the will of the operator.

Fastened to the outer end of each arm 3 is a lowering mechanism for lowering the brick forms from out of the over-turned molds (see Figures 5 and 28). This overturning process will later be described in the mode of operation. The lowering mechanism consists of two side plates 97 held to the arm 3 by means of the braces 98. Slidably mounted by suitable means on the plates 97 are T-bars 99, to whose lower end are pivoted the connecting links 100, which in turn are pivoted to the crank arm 101, one of said arms being provided with operating handle at the pivot. A stop 102 prevents a counter-clockwise falling of lever 101. As the plate carrying the brick forms is placed on the T-bars a clockwise rotation of the crank arm 101 by means of the handle throws it over top center and allows the operator to lower the T-bars and their load. A connecting rod 103 joining the two crank arms 101 causes simultaneous action between the two T-bars holding up one tray of brick forms. The jarring of the turning over of the mold usually loosens the forms sufficiently to enable them to be lowered without further trouble, but should the jar not accomplish this loosening completely, the operator has at his aid the steam-operated pusher-plates 96, which he may bring into play by a simple operation of the chain-operated valve 93, all of which will be described in more detail in the mode of operation.

From the carrying off position, the mold travels to the washer 104 (see Figures 1 and 16), which consists of a hollow casting, conforming to the shape of the molds and provided with a plurality of sprinkling holes 105 alined so that they throw water on the walls of the mold. This washer is mounted in a suitable position over the molds and is supplied with water by a suitable connection. From the washer the molds proceed to their initial position under the clay chamber.

Several of the appendages to this machine will now be described more in detail.

First (see Figure 26), the cutter 75 consists of an angle iron 106 fastened to the I-beam in a suitable manner and having formed therein a series of slots 107. A scraping blade 108 is provided through which bolts 109 pass. These bolts pass through the slots 107 and together with their washers and nuts form a means of locking blade 108 at any desired position for scraping.

The detailed construction and mounting of the molds is as follows: In Figure 19, a plate 110 is permanently fastened to the end of arm 3 and carries by means of suitable bearings the hinge rod 111. To this hinge rod 111 is hinged a false bottom 112, the mold 30, and the clamping rod 113, the latter clamping rod 113, holding the carrying-off tray 91, in a position against the top parts of the mold, ready to take its load of brick shapes as soon as the false bottom 112, mold 30, tray 91, and clamp 113 have been turned over as a unit by the operator, as seen in the dotted position in Figure 19, which shows the tray resting on the T-bars 99 and the false bottom 112 returned to its initial position, tray 91 being ready to have the lowering operation performed. The mold 30 by means of suitably arranged stops made in conjunction with its hinges remains in the position shown in the dotted figure while the tray is lowered with its load of brick forms which was formerly contained in the mold. If the brick forms tend to stick in the mold as the operator lowers the tray onto the T-bars, he may, as already explained, bring into use the pusher plates 96. A modification of the mold has guard plates or wings provided on the sides. These guard plates or wings 114 tend to keep an excessive amount of dirt from falling into the mechanism below (see Figure 29). It will, also, be understood that I am in no way limited to the shape of brick, that is, it need not be of the shape shown in the illustration. In Figure 13 is shown the use of a plain false plate 115 used for making plain bricks and in Figure 14 the type of follower plates used with such a bottom.

In so far as the impact of the descending silica material into the mold situated at the ends of the revolving arms causes undue strain on the central bearing, a stand 116 (see Figure 12) is provided with a face 117 cut thereon to conform to the surface swept out by the lower edge of the fin 118 formed on the bottom of arm 3. Stand 116 is placed at the point where the mold 30 receives its load; in other words, when the arm 3 and its fin 118 are directly over the stand 115. Thus, when the impact occurs, stand 116 bears the force of the live load incurred by the arm's end.

In Figure 15 is shown in more detail the aforementioned method of agitating the silica mixture in the open ended box 40. The agitator consists of a bar 119 journaled in suitable bearings 120 formed on box 40, which said bar is given the reciprocating motion by means of being eccentrically attached to a suitable rotating shaft by means of the crank arm 121 and the connecting link 122. The bar 119 is provided with laterally-extending members 123 which serve to reach more of the material for purpose of agitation.

Lastly, attention is called to the method by which the pin 55, which causes the inner box 39 to jog up and down, may be given a motion of rotation. Pin 55 is formed at right angles to the crank rod 53, which in turn is formed at right angles to the drive shaft 124 (see Figures 4 and 5) journaled in a suitable bearing 125 and driven by a pulley 126. The outer box 40 is mounted rigidly on suitable uprights from the floor and is further braced by rectangular plates 127 joined to said box 40 and I-beam 1 in any suitable manner, such as by rivets 128.

The mode of operation of this machine will now be briefly described.

Motive power is suplied through a belt, which turns the pulley 27, which in turn drives the gears 26 and 25. Gear 25 turns shaft 23 and its attached wheel 22. Wheel 22, as hereinbefore described, causes the jogging of arm 17 in the bearing 28, and by means of pin 16, slot 15, arm 13 and pawl 11 gives an intermittent rotary motion to the shaft 4. This intermittent motion is transferred to the arms 3, which are rigidly attached to shaft 4, and is so timed that at predetermined intervals successive molds come under the action of the filling mechanism. For clearness, we shall follow one mold through a complete cycle of the machine's operation, and it will be understood that the rest of the plurality of molds, being of the same construction, and mounted similarly will go through a similar cycle period. Starting at the washer 104 (see Figure 1), the walls of the mold are cleaned and lubricated by a flush of water out of the washer 104, after which the mold advances to a position under the platen 57, and by reason of predetermined timing of the intermittent motion remains there for a period of time. In the meantime, the afore-mentioned silica mixture has been fed into the box 40 and has been jogged down into the clay chamber by means of the motion of the inner box 39 and the agitator 41. As the mold arrives under the platen, the forming head 48, being so timed, rushes forward as the platen and its appending mechanism rises from the operation on the mold before to open closure 44. The simultaneous opening of closure 44 and the forward rush of former 48 causes the silica-clay contents of chamber 42 to be thrust out into the forming chamber 56 (see Figure 7), which chamber has just arrived at its upper position and has had the bottom plate 58 pushed into place by the slot mechanism hereinbefore described. After the former 48 has reached its furthermost position, as seen in the dotted position of Figure 7, it recedes, while the shaft 65 and its end platen 57 begin to descend, causing the casting 61 and its appendages the three side walls, and the bottom plate 58 to drop. As the casting 61 descends, the bottom plate 58 is withdrawn from under the mass of silica-clay, as already described, and the platen at this point, being given impetus which sends it down faster than gravity, hurls the mass into the mold awaiting beneath. The closure 44 has in the meantime closed, as it was before held open only by the platen itself. As the hurling operation ceases, the shaft is withdrawn automatically (by predetermined timing of inlet and outlet valves), driving with it the platen and consequently the entire casting 61, thus reforming the chamber 56. The same withdrawal opens the closure 44 by means herein already made clear. In the meantime, the mold has advanced to the scraper 75, which scrapes off all clay down to a point near the top edge of the mold, but not down to the edge. From here the mold goes to the slicker, which compresses down the level of the top of the mold the clay which was purposely left over the top at the scraping operation. Next the mold moves to a position below and to one side of the pusher points, where the operator puts on the carrying-off plate and swings over the clamping rod 113, grips the false bottom, mold, carrying-off plate, and clamping iron as a unit and turns them over forward with the hinge rod as a common center and deposits all but the clamping bar on the lowering mechanism, said clamping bar swinging further down than the rest of the mechanism, because it is not blocked by the T-bars 99 as the carrying-off plate is (see Figure 5). This operation leaves the carrying-off plate on the T-bars, together with the mold and false bottom. This bottom is returned to its original position while the carrying-off plate is lowered by the T-bar operating mechanism, as hereinbefore described. The lowering plate takes with it the brick forms from out of the molds, while the mold remains in a horizontal position such as in its dotted representation in Figure 19. If the forms stick, the operator operates pusher-plates 96 by means of the chain-valve 93 and causes them to aid gravity in bringing the brick forms down out of the molds. After the forms have been lowered, they are carried away on the carrying-off plate, and the mold is returned to its original position ready to pass on to the washer. It is understood that a lowering mechanism is provided for each arm and travels with it, as illustrated in Figure 1.

Having thus described this invention, I hereby reserve the benefit of all changes in form, arrangement, order, or use of parts, as it is evident that many minor changes may be made therein without departing from the spirit of this invention or the scope of the following claims.

I claim:

1. The herein-described method of molding silica bricks which consists in taking up the mixture, letting it fall, and following its descent with a blow from above thus hurling it into the mold and causing it to push into all the corners of the said mold.

2. The herein-described method of molding silica bricks consisting in feeding the brick mixture into an agitator, agitating said mixture, pushing it out of said agitator in predetermined unital quantities, letting said quantities fall and following their descent with a blow from above thus hurling them into the molds located beneath and causing said quantities to push into all quarters of the mold.

3. The herein-described method of molding silica bricks consisting in feeding the brick mixture into an agitator, agitating said mixture, pushing it out of the bottom and side of said agitator in unital quantities into the path of a descending platen, letting it drop, following its descent with a blow from said platen, and catching it in molds located beneath said platen.

4. The herein-described method of molding silica bricks consisting in taking up the mixture, letting it fall and following its descent with a blow from above thus hurling it into a mold, carrying the molded mixture in said mold to a surfacing device.

5. The herein-described method of molding silica bricks consisting in taking up the mixture, letting it fall and following its descent with a blow from above thus hurling it into a mold, carrying the molded mixture in said mold to a surfacing device and then to a mold empting device.

6. The herein-described method of molding silica bricks consisting in taking up the mixture, letting it fall and following its descent with a blow from above thus hurling it into a mold, carrying the molded mixture in said mold to a surfacing device and then to a mold emptying device where it is turned over and then lowered from out of the mold.

7. The herein-described method of causing the brick material to conform to the shape of the mold by giving said material a velocity and thereby taking advantage of its resulting inherent kinetic energy in order to force said material into the mold and aiding the forcing of the material into the mold by imparting a blow to the material as it enters the mold.

8. The herein-described method of using gravity and a descending blow to give the brick material a downward velocity toward its mold, thereby giving it energy which said material spends in forcing itself into the cavities of the mold.

9. In a brick-holding machine of the type described, the combination of a fast-descending platen, means for placing the material to be molded in the path of said descending platen, means for withdrawing the supports from under the material and letting it fall by gravity after which the platen strikes the material from above, and means for bringing about the latter striking action.

10. In a brick-molding machine, the combination of a feeding box and an agitator, an opening at the bottom and side of said box, a horizontally-moving reciprocating head moving into and across the bottom portion of said box working synchronously with the opening and closing of its aforesaid opening, a supporting forming chamber outside of said opening, means for withdrawing the bottom and downwardly moving said chamber, a fast descending platen-striking clay material relieved of its supports by the withdrawal of the forming chamber bottom.

11. In a brick-molding machine, the combination of a feeding box and an agitator, an opening in the bottom and side of said box, a horizontally-moving reciprocating head moving into and across the bottom portion of said box working synchronously with the opening and closing of its aforesaid opening, a supporting forming chamber outside of said opening, means for withdrawing the bottom and downwardly moving said chamber, a fast descending platen-striking clay material relieved of its supports by the withdrawal of the forming chamber bottom, means for stopping the descent of the platen and molds placed beneath the platen to catch the descending material.

12. In a brick-molding machine, the combination of a forming chamber located under a pushing member, and means in the form of guide slots and pins for withdrawing the bottom of said forming chamber so that the pushing member may descend through the aforementioned chamber.

13. In a brick-molding machine, the combination of a forming chamber located under a pushing member, a horizontally movable bottom in said chamber, guide pins on said bottom, slanting guide slots to carry said guide pins and relatively move said bottom with respect to the rest of the chamber, and a plurality of castings to carry said guide slots.

14. In a brick-molding machine, the combination of a forming chamber located under a pushing member, a horizontally movable bottom in said chamber, guide pins on said bottom, slanting guide slots to carry said pins and relatively move said bottom with respect to the rest of the chamber, a plurality of castings to carry said guide slots, guide blocks formed integrally on the sides of the forming chamber, a pair of vertical slots to lead the sides of the chamber vertically down, and formed in the aforesaid casting which holds the mentioned slanting slots.

15. In a brick-molding machine, the combination of a movable-bottomed forming chamber, means for guiding the chamber vertically downward and at the same time withdrawing the bottom, a casting formed integrally with three sides of the chamber, a vertical piston rod passing through a collar on the casting, a platen at the lower end of said rod, and means for causing the platen to quickly descend and ascend.

16. In a brick-molding machine, the combination of a movable-bottomed forming chamber, means for guiding the chamber vertically downward and at the same time withdrawing the bottom, a casting formed integrally with three sides of the chamber, a vertical piston rod passing through a collar on the casting, a platen at the lower end of said rod, means for causing the platen to quickly descend and ascend, and means for synchronizing the descent of the platen with the descent of three sides of the chamber and the withdrawal of the bottom.

17. In a brick-molding machine, the combination of a movable-bottomed forming chamber, connected to a combination feeding and agitating chamber, a velocity-imparting vertically-moving platen, said platen being adapted to work synchronously with the movable bottom of the forming chamber.

18. In a brick-molding machine, the combination of a feeding box and an agitator, an opening at the bottom and side of said box, a horizontally moving reciprocating head moving into and across the bottom portion of said box, working synchronously with the opening and closing of its aforesaid opening, a supporting forming-chamber outside of said opening, means for withdrawing the bottom and downwardly moving said chamber, a fast descending platen hurling clay material relieved of its supports in the withdrawal of the forming chamber.

19. In a brick-molding machine, the combination of a plurality of mold-members divided into a plurality of brick shapes rotatably mounted and moving in a horizontal plane, a delivery mechanism for filling said divided mold members with clay or silica mud, a smoothing mechanism, an unloading mechanism, and a washer for said molds.

20. In a brick-molding machine, the combination of a plurality of mold members, themselves divided into suitable brick shapes, said plurality of mold members being mounted at the ends of rotating arms, said arms moving in a horizontal plane, suitable mechanism for operating said arms, means for unloading the molds, means for suitably surfacing their contents, and a washer for cleaning and lubricating said molds before each reloading.

21. In a brick-molding machine, the combination of a plurality of mold members subdivided into brick shapes, said molds being moved rotatably in a horizontal plane due to their being mounted at the ends of a plurality of arms, said arms being formed integrally at their common center of rotation and being given an intermittent rotary motion, suitable mechanism for giving intermittent motion, said motion being so timed that the molds shall be made to stop for predetermined intervals of time beneath a feeder mechanism, a slicker mechanism, an unloading mechanism, and a mold washing mechanism respectively.

22. In a brick-molding machine, the combination of a feeder mechanism consisting substantially of two boxes telescoped one within the other, the inner box being given an up and down jogging motion with respect to the outer box by a crank pin together with its conventional driving parts, and a slotted member in which said pin works rigidly attached to the aforesaid inner box.

23. In a brick-molding machine, the combination of a feeder mechanism consisting substantially of two boxes telescoped one within the other, the inner box being given an up and down jogging motion with respect to the outer box by a crank pin together with its conventional driving parts, a slotted member in which said pin works rigidly attached to the aforesaid inner box, a reciprocating agitator working horizontally and journaled in the side walls of the lower part of the outside box.

24. In a brick-molding machine, the combination of a feeder mechanism consisting substantially of two boxes telescoped one within the other, the inner box being given an up and down jogging motion with respect to the outer box by a crank pin together with its conventional driving parts, a slotted member in which said pin works rigidly attached to the aforesaid inner box, a reciprocating agitator working horizontally and journaled in the side walls of the lower part of the outside box, and underclay chamber consisting of a vertically sliding closing member at one end of said clay chamber, two ordinary side walls and an unloading traveling head at the other end, said traveling head and closing member being actuated synchronously to discharge a load deposited in the clay chamber from the box.

25. In a brick-molding machine, the combination of a telescoping jogging feeding mechanism, and charging device, a mechanical device for auxiliary direct feed into the mold consisting of a quickly descending vertically moving piston and having attached a shaft to whose lower end is attached a platen adapted to strike masses of material as they are fed in under by the aforesaid telescoping jogging feeder, and charging device an auxiliary device attached to the last-mentioned mechanism consisting of a vertically moving group of three sides of a box integrally formed with one another and a horizontally moving bottom for said sides, the fourth side being the closing door of the aforementioned telescoping feeder.

26. In a brick-molding machine, a device for taking excess material from the tops of molds consisting of a member attached to the main frame of the machine and a scraper attached to said member and adjustable thereon toward and from the mold.

27. In a brick-molding machine, the combination of a scraper for removing excess material from the top of the molds and a rotating and reciprocating slicking mechanism.

28. In a brick-molding machine, the combination of a scraper and a slicking device, said slicking mechanism consisting of a horizontally mounted disk, which, by means of a vertical shaft, an arm rigidly attached thereto, a cross-link connected at one end to said arm and at the other end to an arm of shorter length than the arm first-mentioned and rotating at a constant rate of speed together with a slidable spring pressed connection between the disk and its shaft, is made to move in a reciprocating and rotary manner at the same time pressing downwardly.

29. In a brick-molding machine, a cleaning and lubricating device for the molds, consisting of a pipe frame suspended over the path of the molds, said pipe frame being of the shape of the mold walls and having therein holes which sprinkle water over the mold walls, said water being led into the sprinkler by a pipe and connection.

30. In a brick-molding machine, the combination of a scraper and a slicking device, said slicking device consisting of a horizontally mounted disk, and means for imparting a reciprocating and rotary movement to said disk.

31. In a brick-molding machine of the type described, the combination of a feeding mechanism consisting of two boxes, one slidably mounted within the other having therebeneath a reciprocating agitator mounted laterally across the box and, also, a clay chamber adapted to be emptied by means of a reciprocating pushing head and an intermittently opening and closing door, a hurling mechanism consisting of a rapidly descending and ascending platen arranged to work in conjunction with a forming chamber which in itself is so slidably arranged in its respective parts that it is caused to place a quantity of clay material in the path of the rapidly descending platen causing the same to hurl the clay material into a mold waiting beneath, a smoothing or slicker mechanism consisting of an intermittently rotating horizontal plate slidably arranged longitudinally on said shaft, the shaft being given an intermittent rotary motion by means of an eccentrically mounted driving link in connection with a rotating shaft, and an arm extending laterally from the vertical shaft, a washer for the molds in the form of a suitably shaped sprinkler conforming to the mold shape, an intermittent motion-giving mechanism consisting of a suitably timed reciprocating arm driven by a connecting link attached eccentrically to a rotating wheel, said reciprocating arm imparting its reciprocating movement to the vertical drive shaft by means of a pawl and ratchet combination and having its intermittent motion made more pronounced by means of a notched guard plate and riding catch which cause a pronounced stop at predetermined periods, mold support consisting of a plurality of laterally extending arms rigidly attached to one another and attached rigidly to a central drive shaft carrying at their ends molds, said molds being each formed with a plurality of forming chambers corresponding to the shape of the brick required.

32. In a brick-molding machine, the combination of molds mounted at the end of rotating arms extending out horizontally from a vertical revolving shaft, a mud hurling mechanism to hurl mud into said molds at a predetermined position of the respective arms upon which said molds ride, a bracing stand located beneath the point where the load of mud strikes the mold on the end of its arm, said bracing stand being of such a height as to let the bottom of the arm end ride onto said stand.

33. In a brick-molding machine, the combination of rotating arms, molds placed on the ends of said arms, and form-lowering mechanism mounted on the ends of said arms.

34. In a brick-molding machine, the combination of rotating arms, molds placed on the ends of said arms, form removing mechanism mounted on the ends of said arms, and means adapting the molds and their contents to be rotated, thereby turning them over.

35. In a brick-molding machine, the combination of a plurality of rotating arms, a widened portion at the ends of said arms, hinged bars located on the outer end of said widened portions, a false bottom hinged to said bars, a mold hinged to said bar, a clamping iron hinged to said bar, a brick form lowering apparatus attached to the ends of aforesaid arms, and a device for lowering the brick forms out of the molds if the force of gravity is not sufficient.

36. In a brick-molding machine, the combination of a plurality of rotating arms, a widened portion at the ends of said hinged bars located on the outer ends of said widened portions, a false bottom hinged to said bar, a mold hinged to said bar, a clamping iron hinged to said bar, a brick form lowering apparatus attached to the ends of aforesaid arms, said apparatus consisting of two outwardly extending plates carrying slidably two similar T-bars, said T-bars being linked each by a single cross-link to the end of a crank arm journaled at its center of rotation on the aforesaid plates, said crank carrying its handle at the point of its joining the aforesaid link, said crank being provided with an over-center stop fastened rigidly to the aforementioned plates, a device for forcing the brick forms out of the mold if the force of gravity is not sufficient.

37. In a brick-molding machine, the combination of a plurality of rotating arms, a widened portion at the ends of said arms, hinged bars located on the outer ends of said widened portions, a false bottom hinged to said bar, a mold hinged to said bar, a clamping iron hinged to said bar, a brick form lowering apparatus attached to the ends of aforesaid arms, said apparatus consisting of two outwardly extending plates carrying slidably two similar T-bars, said T-bars being linked each by a single cross-link to the end of a crank arm journaled at its center of rotation on the aforesaid plates, said crank carrying its handle at the point of its joining the aforesaid link, said crank being provided with an over-center stop fastened rigidly to the aforementioned plates, a device for forcing the brick forms out of the mold if the force of gravity is not sufficient, said device consisting of a piston working in an overhead cylinder and operated by a chain valve admitting and exhausting steam, said piston having at its lower end a plurality of arms downwardly directed and carrying on their ends pusher plates and all capable of being moved vertically up or down at the will of an operator by means of his operating the aforesaid valve, and means for bringing the molds from the rotating arm ends upon which they are located to the lowering mechanism.

38. In a brick-molding machine, means for unloading the molds, said means consisting of a false bottom for the mold, said bottom being hinged to a hinge bar, a top plate, a clamping bar hinged to the aforesaid hinge bar which holds the aforesaid top plate on the top of the mold, a lowering mechanism to receive the mold and its aforementioned equipage when it is turned over, a plurality of pusher plates made to fit the plurality of brick sections in the mold, means for lowering said pusher plates, and means for lowering the top plate, after the turn-over of the bottom or carrying-off plate, with its load down ahead of said pusher plate.

39. In a brick-molding machine, means for holding the mold and its contents intact while said molds and its contents are being overturned, said means consisting of a false bottom to hold the brick forms up in the mold while the overturning process is first proceeding and a carrying-off plate to hold the bricks in said mold while the overturning process is about to end, said carrying-off plate being held against the mold top by means of a clamping iron hinged to a hinge bar at the base of the mold and to which is hinged the mold itself and the aforesaid false bottom, said clamping iron being shaped in the form of a sharp cornered U with its ends bent at right angles to the base of the U, said ends being formed in the shape of eyes to fit over and hinge on the hinge bar.

40. In a brick-molding machine, the combination of a rotating arm and a mold hinged to said arm.

41. In a brick-molding machine, the combination of a hinged mold, a hinged false bottom, and hinged top clamp, an outwardly laterally extending rotating arm holding said members, and, also, a device for relieving the rotatable mold of its load.

42. In a brick-molding machine, the combination of an intermittently actuated rotatable plurality of laterally extending arms, means for driving said arms in the said manner, false mold bottoms hinged laterally at the end of said arms, molds hinged laterally at the end of said arms, mold clamps hinged laterally at the end of said arms, and a hinge rod fastened rigidly and laterally at the end of said arms.

43. In a brick-molding machine, the combination of an intermittently actuated rotatable plurality of laterally extending arms, means for driving said arms in the said manner, false mold bottoms hinged laterally at the end of said arms, molds hinged laterally at the end of said arms, mold clamps hinged laterally at the end of said arms, a hinge rod fastened rigidly and laterally at the end of said arms, and a lowering device attached to the end of said arms.

44. In a brick-molding machine, the combination of a false mold bottom hingedly fixed at the end of a rotating arm, said mold bottom being formed with an upwardly extending sectioned bottom mold floor, a hinged mold containing sectional parts so formed as to surround snugly the aforesaid mold floors, a top or carrying off plate on the top of said mold, a mold clamp hinged at the same point as the aforesaid hinged member, a stop on the hinge of the mold member so formed as to hold the mold in a horizontal position while the carrying-off plate and the contents of the mold are being lowered.

45. In a brick-molding machine, the combination of a false mold bottom hingedly fixed at the end of a rotating arm, said mold bottom being formed with an upwardly extending sectioned bottom mold floor, a hinged mold containing sectional parts so formed as to surround snugly the aforesaid mold floors, a top or carrying-off plate on the top of said mold, a mold clamp hinged at the same point as the aforesaid hinged members, a stop on the hinge of the mold member so formed as to hold the mold in a horizontal position while the carrying-off plate and the contents of the mold are being lowered, side wing-plates horizontally formed on the molds to keep excess material from dropping into the lower working parts of the mechanism.

46. In a brick-molding machine, the combination of means for revolving intermittently a plurality of forming molds at the ends of a plurality of laterally extending arms, a mechanism for downwardly vertically hurling the mud into the molds at one of the stopping points of the molds, a combination slide box agitator and unit quantity feeding mechanism for feeding said hurling mechanism, a bracing stand located beneath the aforesaid point of stoppage of the mold, a scraper located beyond this point of stoppage, and above the mold at a point above the path of the motion, a slicker located beyond the scraper, said slicker having a plate which is given a reciprocating motion of rotation and at the same time a downward pressure, a brick form lowering mechanism at the ends of the rotating arms, means adapting the mold and its contents to be turned over and its bottom to be returned to its original position on the arm and, the contents of the mold to be lowered and the mold returned to its original position, all at a predetermined stop of the machine, a mold washer located over a predetermined stop of the molds before they get beneath the filling mechanism.

47. In a brick-molding machine, the combination of rotating arms, and form-lowering mechanism carried by said arms.

48. The herein described method of molding silica bricks which consists in letting the mixture fall into a mold and accompanying its descent with a blow in order to force said material into all quarters of the mold.

49. The herein described method of causing the brick material to conform to the shape of the mold which consists in giving said material velocity and imparting a suddenly increased velocity to said material as it strikes the mold.

50. In a brick-molding machine of the type described, the combination of a fast-descending platen, means for placing the material to be molded in the path of said descending platen, means for permitting said material to fall by gravity, and means for causing the descending platen to strike the falling material a blow in order to force said material into all quarters of the mold.

51. In a brick-molding machine, the combination of a pushing member, a forming chamber under said pushing member, and means for withdrawing the bottom of said forming chamber to permit the pushing member to descend through said chamber.

52. In a brick-molding machine, a plurality of mold members rotatable in a horizontal plane, in combination with a delivery mechanism, for filling said molds with material, a smoothing mechanism, a slicking mechanism, an unloading mechanism and a washing device for said molds.

53. In a brick-molding machine, the combination of rotating arms, moving in a horizontal plane, a plurality of mold members mounted on said arms, and suitable mechanism for operating said arms.

54. In a brick-molding machine, the combination of a feeder mechanism comprising boxes telescoped one within the other, and means for imparting to the inner box an up and down jogging motion with respect to the outer box.

55. In a brick-molding machine, a cleaning and lubricating device for the molds, consisting of a pipe frame suspended over the path of the molds, said pipe frame being provided with holes through which water may be sprinkled over the mold walls, and means for supplying water to said pipe frame and the holes therein.

56. In a brick-molding machine, the combination of horizontally rotating arms, molds hinged to said arms, and form lowering mechanism carried by said arms.

57. In a brick-molding machine, the combination of a rotating arm, a mold hinged to the end of said arm, and means carried by said arm for turning said mold on its hinge to transfer the mold from the arm to a support preparatory to removing the brick form from the mold.

58. In a brick-molding machine, the combination of a single I-beam span having journaled therein one end of a vertical rotating shaft, a plurality of laterally extending arms rigidly attached to said shaft and moving rotatably in a horizontal plane beneath said span, a plurality of supports holding a bearing which journals the substantially central portion of the aforesaid shaft by means of ball bearings and suitable races on the bearings, and a rigidly attached horizontal member for the shaft, a bearing situated at the base of said shaft and there journaling the same, molds located on the aforesaid arms, means for vertically hurling mud from a height down into the molds, a bracing stand situated under the arms where the hurling process takes place.

In testimony whereof I hereunto affix my signature.

WILLIAM ALLEN MILLER.